July 10, 1951 | J. B. SHICKEL | 2,560,254

DEVICE FOR SEPARATING THE MAGNETIC TRANSDUCER AND RECORD MEMBER DURING REWIND

Filed March 26, 1948

INVENTOR
JAMES B. SHICKEL
BY [signature]
ATTORNEY

Patented July 10, 1951

2,560,254

UNITED STATES PATENT OFFICE 2,560,254

DEVICE FOR SEPARATING THE MAGNETIC TRANSDUCER AND RECORD MEMBER DURING REWIND

James B. Shickel, Baldwinsville, N. Y., assignor to Radio Corporation of America, a corporation of Delaware Application March 26, 1948, Serial No. 17,222

2 Claims. (Cl. 179—100.2)

This invention relates to magnetic sound recording and reproducing apparatus of the type employing reelable (wire or tape) records and has special reference to improvements in reeling systems for such records.

Modern magnetic phonographs, and especially those capable of handling very long records, are usually provided with a reeling system capable of being run much more rapidly in the "re-wind" direction than in the "forward" (recording or reproducing) direction. When the path of the record is the same in both directions the wear upon the magnetic transducers (i. e. the erasing, recording and reproducing heads) is, obviously, much greater than is either necessary or desirable. It has therefore previously been proposed to minimize such wear by the provision of a retractable mechanism for lifting the record medium (i. e., tape or wire) off the transducers during the rewinding interval. The mechanisms heretofore provided for this purpose have taken the form of a carriage, or roller mounted, as on a rack, for movement into or out of lifting engagement with the record. The objections to such record-lifting mechanisms reside not only in their expensive and indeed cumbersome construction but in the fact that they are not "self-clearing" and hence may be left, inadvertently, with the carriage or roller in a position other than that dictated by the direction in which the record is to run.

Accordingly, it is an object of the present invention to provide a simple, inexpensive and trouble-free mechanism for shifting the path of a reelable magnetic record medium away from the sound-heads or "magnetic transducers" of a recording or reproducing instrument during the "re-wind" interval, and one which operates automatically to restore the record to its normal path (i. e. contiguous the magnetic transducers) when the record is driven in the "forward" (recording or reproducing) direction.

Another and related object of the present invention is to provide a lifting mechanism for a reelable magnetic record medium which shall be responsive both to the "forward" and to the "re-wind" directions of movement of said record.

The invention is described in connection with the accompanying drawing, wherein.

Figure 1:
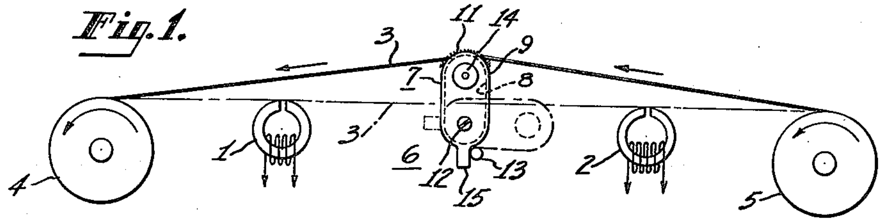
Fig. 1 is a front elevation of a record-lifting and guiding mechanism constructed in accordance with the principle of the invention and showing a reelable tape record medium in its raised position between two spaced apart magnetic transducers whilst the record is being rewound.
Figure 2:
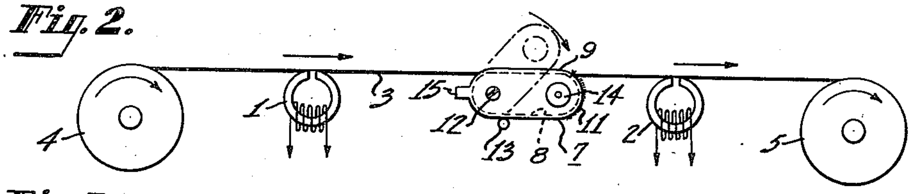
Fig. 2 is a view of the device of Fig. 1 showing how the lift mechanism is automatically restored to its idle position when the record medium is run in the "forward" recording or reproducing direction.
Figure 3:
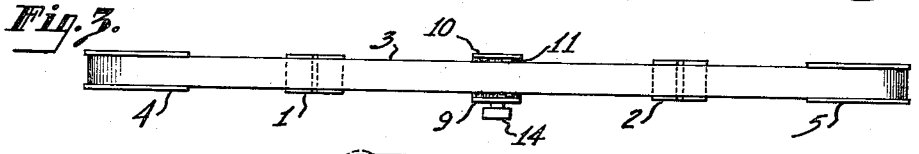
Fig. 3 is a top plan view of the lift arm of Figs. 1 and 2.

In the embodiment of the invention shown in Figs. 1, 2 and 3, 1 and 2 designate, respectively, two spaced apart magnetic transducers or sound-heads against which a reelable magnetic record medium, exemplified by the paper (or "plastic") tape record 3, is caused to bear during its journey in the "forward" (playing or reproducing) direction between a storage reel 4 and a take-up reel 5. The reeling motor or motors (not shown) may be of any convenient type and, in agreement with the preferred practice, may be arranged to drive the tape more rapidly in the re-wind direction than in the playing or reproducing direction. As previously indicated, in order to minimize friction and consequent wear upon the sound-heads 1 and 2 and upon the tape or other reelable record medium 3 the present invention provides means, indicated generally at 6, for supporting the record medium 3 off the sound-heads 1 and 2 while the record is being run in the return direction, i. e. between the take-up reel 5 and the storage reel 4, as indicated by the arrows in Fig. 1.

In the preferred embodiments of the invention which have been selected for illustration the record-lifting mechanism 6 serves not only to support the record medium 3 during the rewinding interval (as shown in Fig. 1) but also serves as a guide for preventing undesired lateral movement of the record while it is being run in the forward direction (shown in Fig. 2). To this end, the said mechanism comprises a "shoe" 7 having a flattened-cylindrical base or core portion 8, of a width somewhat greater than that of the tape or other record medium, and a pair of oppositely located flange portions 9 and 10 which extend above the flattened sides and rounded ends of the core to define a groove or track for the record medium. This groove or track is lined, as indicated at 11, Fig. 3, with a wear-resisting frictional material such as felt or flock. The shoe 7 is mounted upon a pivot 12 in the space between the magnetic transducers or sound-heads 1 and 2 and, when the record is being run from the storage reel 4 to the take-up reel 5, rests on one of its long sides upon a pin or stop 13 so that the record is received in and is guided by the longitudinal portion of the groove of the shoe.

In the embodiment of the invention shown in Figs. 1, 2 and 3, the front surface of the pivoted shoe 7 is provided, adjacent to its free end, with a pinion or knob 14 so that it may be swung upwardly on its pivot 12 to lift the record 3 off the magnetic transducers 1 and 2 when the record is to be rewound upon its storage reel 4. A protuberance 15 on the lower or pivoted end of the shoe 7 engages the stop 13 when the shoe is in its raised position. The shoe is maintained in its raised position, with its protuberance 15 against the stop 13, so long as the record medium is being run in the direction of the storage reel 4, by the force exerted upon the frictional surface 11 of the shoe by the moving record medium.

One very real advantage of the pivoted record-lifting mechanism of the invention resides in the fact that the record medium is automatically restored to its normal path contiguous the magnetic transducers 2 and 3 as soon as the tape is driven in the forward direction (shown in Fig. 2). The restoration of the record to its normal path occurs by reason of the tilting force applied to the shoe 7 through its frictional surface 11 by the forward movement of the record medium.

Figure 4:
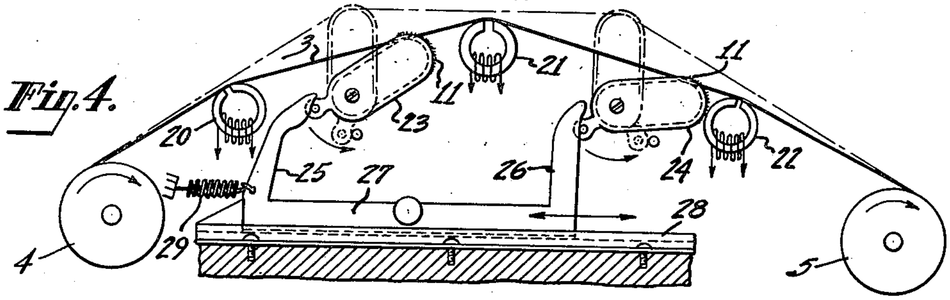
Fig. 4 is a front elevation of an alternative embodiment of the invention, showing a dual lift-mechanism for a phonograph having three magnetic transducers.

When the invention is applied to a magnetic recording and reproducing machine having three (instead of two) magnetic transducers, it is preferable to provide a record-lifting shoe between adjacent ones of the transducers and to provide a suitable yoke mechanism for actuating both shoes simultaneously. Such an arrangement is shown in Fig. 4 wherein the record 3 in its journey between the storage reel 4 and the take-up reel 5 traverses a path defined by three magnetic transducers, comprising an erasing head 20, a recording head 21 and a reproducing head 22, each disposed at an angle of, say 13°–15° with respect to the next adjacent transducer. Here one shoe 23 is pivotedly mounted in the path of the record between the magnetic transducers 21 and 22 and the other shoe 24 is pivotedly mounted in the path of the record between the magnetic transducers 22 and 23. The force required to lift the tape off the transducers during the re-wind interval is applied simultaneously to both of the shoes 23 and 24 by two actuating arms 25 and 26 which are connected together by a yoke 27. The yoke is shown mounted for slidable movement on a panel or bracket 28 and is normally biased, as by a spring 29, to a position whereat the shoes 23 and 24 are in their lowered or idle position. Movement of the yoke to the right against the force of the spring 29 moves the shoes upwardly where they remain so long as the tape or other record medium is being rewound. As in the earlier described embodiment of the invention, movement of the record 3 in the forward direction causes the shoes 23 and 24 to drop back to their idle position and automatically restores the record to its normal path contiguous the magnetic transducers 20, 21 and 22. If it is desired to run the record in the forward direction out of contact with the transducers (e. g. for the purpose of reaching a selected portion of the record)

the shoes 23 and 24 may be maintained in their upright position simply by moving the yoke 27 to the right and holding it there against the bias of the spring 29.

Figure 5:
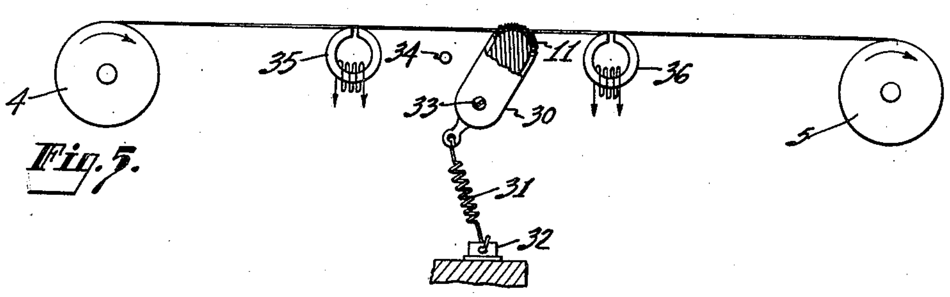
Fig. 5 is a front elevational view of a different embodiment of the invention wherein the operation of the record-lifting mechanism is controlled solely by the direction of movement of the reelable record medium.

In the embodiment of the invention shown in Fig. 5 the position of the pivoted record-lifting shoe, which is here designated 30, is controlled entirely by the direction of movement of the reelable record 3. Here a light-weight spring 31 connected between the shoe 30 and a bracket 32 beneath the pivot 33 tends to move the shoe to its upright position, but the biasing force of the spring 31 is overcome by the tilting force applied to the shoe through the wear-resisting frictional lining 11 by the forward or the reverse movements of the record. When the record is being re-wound upon the storage reel 4 the shoe is urged against a pin or other stop 34 on the side adjacent to the said reel so that the record is maintained off the magnetic transducers 35 and 36 throughout the rewinding interval.

It will now be apparent that the present invention provides a simple, inexpensive and trouble-free mechanism for shifting the path of a reelable magnetic record medium away from the sound-heads and other magnetic transducers of a recording and reproducing instrument during the rewinding interval, and one which operates automatically to restore the record medium to its normal path contiguous the said transducers when the record medium is driven in the forward (recording or reproducing) direction.

What is claimed is:

1. In a reeling system for sound translating apparatus of the type wherein a reelable record medium is adapted to be moved in either of two directions past a transducer in a path normally contiguous to said transducer, a device for moving the medium out of said path away from said transducer, said device comprising a record medium contacting member mounted adjacent to said path for limited pivotal movement, means responsive to the direction of movement of said record medium for developing a torque by frictional contact between said member and said record medium for rotating said member about its pivot to move said member from one to the other of two positions, and means including said member for moving said record medium out of said normal path upon rotation of said member to one of said positions and for restoring said record medium in said normal path upon rotation of said member to the other of said positions.

2. The invention as set forth in claim 1 and characterized by the addition of biasing means associated with said record medium contacting member whereby frictional contact between said record medium contacting member and said record medium may be maintained.

JAMES B. SHICKEL.

REFERENCES CITED

The following references are of record in the file of this patent:

UNITED STATES PATENTS

| Number | Name | Date |
|---|---|---|
| 2,468,198 | Heller | Apr. 26, 1949 |

FOREIGN PATENTS

| Number | Country | Date |
|---|---|---|
| 702,345 | Germany | Feb. 5, 1941 |